United States Patent [19]

Gardner

[11] Patent Number: 4,696,111
[45] Date of Patent: Sep. 29, 1987

[54] DEVICE FOR ASSESSING INCLINATION

[76] Inventor: Orian R. Gardner, 419 Marin Ave., Mill Valley, Calif. 94941

[21] Appl. No.: 859,375

[22] Filed: May 5, 1986

[51] Int. Cl.⁴ .............................................. G01C 9/12
[52] U.S. Cl. ...................................... 33/262; 33/290; 33/282; 33/347; 33/391; 273/183 E
[58] Field of Search ...................... 273/183 E, 183 B; 33/289, 262, 391, 392, 290, 291, 347, 333, 273, 283, 285

[56] References Cited

U.S. PATENT DOCUMENTS 3,535,792 10/1970 Douglas ................................ 33/283
4,141,152 2/1979 White ................................ 33/262 X Primary Examiner—William D. Martin, Jr.
Attorney, Agent, or Firm—John A. Bucher

[57] ABSTRACT

A viewing device to assist a golfer or the like in assessing transverse inclination of terrain along his sight line, including a base assembly adapted for attachment to a cap, hat or headpiece worn by the golfer or the like, a vertical plumb element pivoted to the base assembly about an axis parallel to the wearer's sight line of the terrain and a horizontal sighting element fixed perpendicularly along its length permitting the wearer to view seleccted terrain relative to the horizontal sighting element and rapidly assess its transverse inclination. With the base assembly secured to the bill of a cap or the like, a viewing frame surrounds the vertical plumb element and horizontal sighting element while including means for retaining both the viewing frame and vertical plumb element and horizontal sighting element out of the wearer's sight line when desired.

7 Claims, 4 Drawing Figures

DEVICE FOR ASSESSING INCLINATION

FIELD OF THE INVENTION

The present invention relates to viewing devices for use by golfers and the like for rapidly assessing transverse inclination of terrain.

BACKGROUND OF THE INVENTION

A large number of devices have been provided in the prior art, particularly for use by golfers, as a training device or aid to assure that the golfer is properly addressing the ball and maintaining his stance during both the backstroke and forward stroke when hitting the ball with a golf club. Many of these prior art devices have also included a plumb bob or vertical plumb device to provide a true vertical reference for the golfer. A number of these 20 devices are summarized immediately below in order to provide a better understanding of the prior art.

Initially, U.S. Pat. No. 3,109,654 issued Nov. 5, 1963 is representative of a number of U.S. patents relating to devices which can be attached to golfer's caps or other headwear. These devices generally included a plumb bob freely suspended from the cap. Generally, the plumb bob permits the golfer to be aware of any movement in the plumb bob as an indication of whether or not the golfer moves his head while addressing and striking the ball. It is generally understood that such movement of the head is undesirable.

Similar devices including a suspended plumb bob attached to a golfer's cap or the like were provided in U.S. Pat. No. 3,178,187 issued Apr. 13, 1965; U.S. Pat. No. 3,437,339 issued Apr. 8, 1969; and U.S. Pat. No. 3,951,414 issued Apr. 20, 1976. U.S. Pat. No. 4,098,509 issued July 4, 1978 is another related prior art reference which does not include a suspended plumb bob but rather includes a device attached to a golfer's hat for providing an audible signal if the golfer moves his head while addressing or hitting a golf ball.

U.S. Pat. No. 3,826,502 issued July 30, 1974 and U.S. Pat. No. 4,079,940 issued Mar. 21, 1978 both disclosed attachments for golfer's caps including a fixed loop or other means through which the golfer sights the ball while addressing it. Here again, the purpose of these attachments is to assure that the golfer does not move his head while addressing and striking the ball.

Finally, U.S. Pat. No. 3,860,246 issued Jan. 14, 1975 disclosed yet another device with a plumb or pendulum being suspended from the golfer's mouth for the same purpose of preventing movement of the golfer's head.

These prior art devices are generally indicative of the desire for means to assist golfers in improving their skills. However, most of these devices are directed toward the stance or position of the golfer himself. Yet other well-known devices are available for assisting the golfer in assessing distance. Such devices are not discussed in greater detail herein. However, a number of techniques have been employed in the design of devices for this purpose.

Even with this variety of devices available to the golfer, there has been found to remain a need for a device for use by golfers and the like in rapidly assessing inclination of terrain transverse to his sight line. For example, during approach shots on a green or on the green itself, it is often particularly important for the golfer to be able to accurately assess transverse inclination of terrain along the green between his ball and the hole. The utility of such a device for golfers and others is believed obvious.

SUMMARY OF THE INVENTION

It is therefore an object of the invention to provide a viewing device for use by golfers or the like as an aid in assessing transverse inclination of terrain. Preferably, the device is contemplated as either an integral part or attachment to a cap, hat or other headpiece worn by the golfer or other user.

It is a further object of the invention to provide such a viewing device including base means for attachment to the headpiece of the wearer, a vertical plumb element pivotably supported from the base means about an axis parallel to the wearer's sight line of the terrain and a horizontal sighting element affixed to the vertical plumb element along its length while being perpendicular both to the plumb element and its pivotal access on the base means. Through such a combination, the wearer may view selected terrain relative to the horizontal sighting element and rapidly assess transverse inclination of the terrain.

It is yet a further object of the invention to provide such a device which can be selectively moved out of the wearer's sight line.

It is yet another further object of the invention to form the viewing device with a viewing frame adapted for surrounding the vertical plumb element and horizontal sighting element to enhance the wearer's use of the viewing device. In a preferred embodiment, the viewing frame intersects a portion of the vertical plumb element and horizontal sighting element, both the viewing frame and vertical plumb element being pivotably mounted on the base means along a common axis so that they can be simultaneously moved out of the wearer's sight line.

It is yet another related object of the invention to provide such a viewing device including detent means for maintaining the vertical plumb element and/or viewing frame either in a sixth position out of the wearer's sight line or in a position to assure that they are available for use by the wearer. In this regard, the viewing device is preferably adapted for mounting on a bill of a cap. In a preferred embodiment, hinge means securing the viewing frame to the base means forms both of the detent means referred to above.

Additional objects and advantages of the invention are made apparent in the following description having reference to the accompanying drawings.

BRIEF DESCRIPTION OF THE DRAWINGS

Referring now to the drawings.

DESCRIPTION OF THE PREFERRED EMBODIMENT

Figure 1:
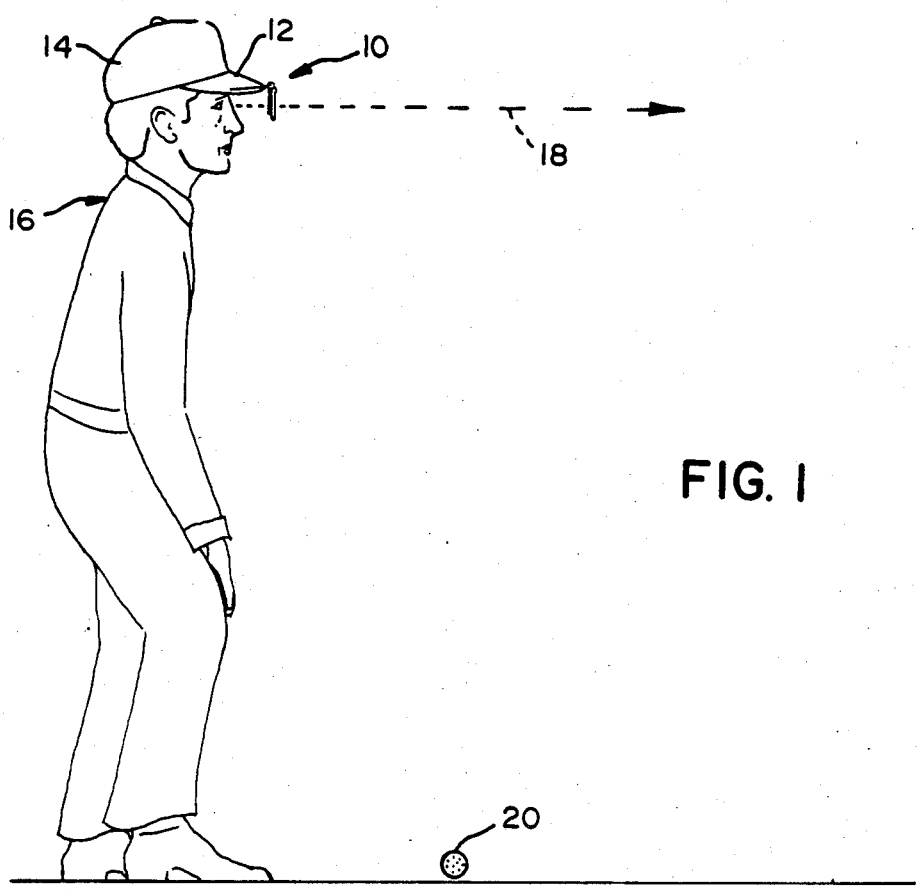
FIG. 1 is a pictorial side view in elevation of a golfer wearing a cap with the viewing device of the present invention being attached to the cap for use by the golfer in assessing the transverse inclination of terrain on a golf course.

Referring now to the drawings and particularly to FIG. 1, the present invention is directed toward a viewing device for use by golfers or the like in assessing transverse inclination of terrain. The device is generally indicated at 10 in FIG. 1 and is contemplated as either an integral part of or an attachment to a cap, hat or headpiece worn by a golfer or other individual wishing to assess transverse inclination of terrain. In FIG. 1 as in the other figures of the drawings, the device 10 is illustrated as an attachment for mounting on the bill 12 of a cap 14 worn by a golfer 16.

As one example of an application for the viewing device 10 of the invention, the golfer 16 is represented viewing along a sight line 18 in the direction in which he wishes to hit a golf ball 20. As noted above, the viewing device 10 is particularly useful when the golfer is contemplating either an approach shot to a green (not shown) or a putt on the green itself. In either event, the golfer views the green or terrain lying between the ball 20 and a hole (not shown) on the green in the direction indicated by the sight line 18. As is well-known to those skilled in the game of golf, it is particularly important for the golfer to be able to assess transverse inclination of terrain so that he can better determine how to address and hit the golf ball 20.

Figure 2:
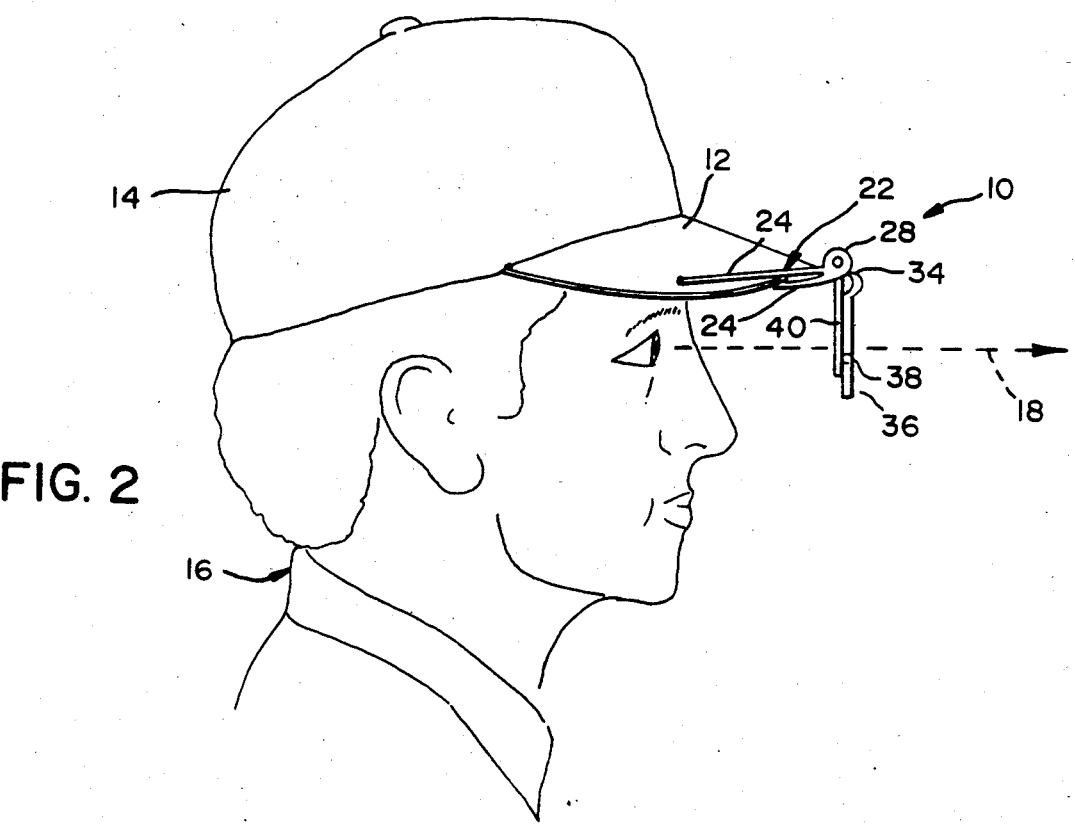
FIG. 2 is an enlarged fragmentary view similar to FIG. 1 while including greater detail of the viewing device of the invention in a position for use by the wearer.
Figure 4:
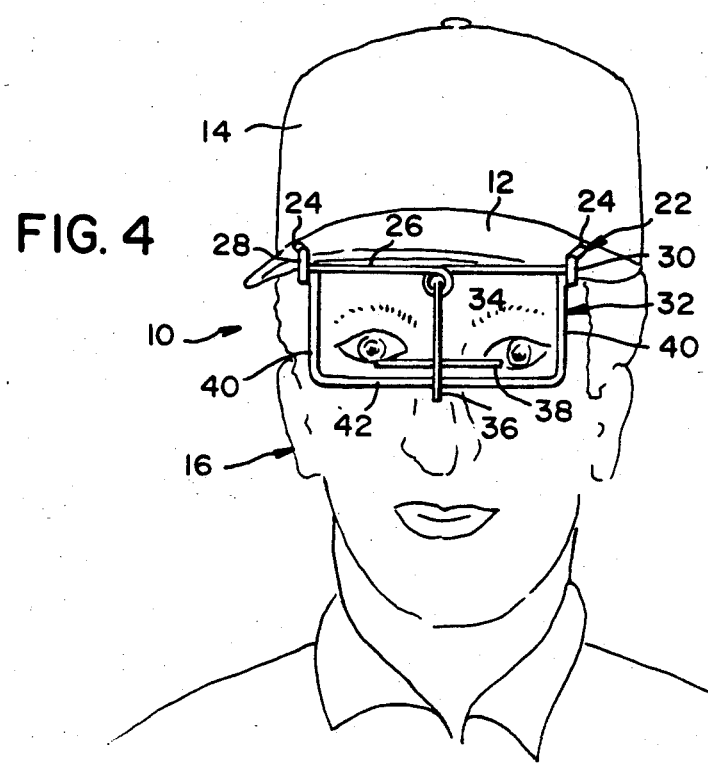
FIG. 4 is a view taken from the right side of FIG. 2 to better illustrate details of construction for the viewing device of the invention.

Referring now in combination to FIGS. 2 and 4, the viewing device 10 includes a base assembly 22 formed as a resilient chip with respective members 24 extending rearwardly both above and beneath the bill 12 of the cap with the members or wires 24 being resiliently urged toward each other, they will accordingly serve to secure the base assembly 22 in place upon the cap.

A transverse wire or member 26 is pivotably secured to the base assembly by detent means 28 and 30. The transverse member 26 forms a portion of a viewing frame 32 while also forming a pivot point 34 for a vertical plumb element 36. Thus, the detent means 28 and 30 provide a common pivot for both the viewing frame 32 and the vertical plumb element 36 for a purpose described in greater detail below.

As may be best seen in FIG. 4, the vertical plumb element 36, at least in its operative position, extends downwardly generally beneath the sight line 18 for the wearer. A horizontal sighting element 38 is affixed to a mid-portion of the vertical plumb element 36 generally adjacent the sight line 18 for the wearer so that he is able to compare terrain being viewed with the horizontal sighting element 38. Within the above noted construction, the pivot point 34 is formed along an axis parallel to the sight line 18 so that the vertical plumb element 36 is free to move in a plane perpendicular to the sight line 18. Thus, the vertical plumb element 36 will always establish a true vertical reference with respect to the sight line 18 for the golfer.

At the same time, the horizontal sighting element 38 is affixed in perpendicular relation both to the vertical plumb element 36 and to the axis of the pivot point 34. Thus, when the vertical plumb element 36 establishes a true vertical reference, the horizontal sighting element 38 necessarily establishes a true horizontal reference which the golfer 16 may use as a reference relative to the green or other terrain being inspected along the sight line 18. In this manner, he may accurately assess transverse inclination of the green or terrain relative to the horizontal sighting element 38.

In order to further assist the golfer or other wearer in comparing terrain with the horizontal sighting element 38, the viewing frame 32 also includes side elements 40 and a lower transverse element 42. The side elements 40 and lower element 42 together with the transverse member 26 form a viewing frame surrounding the intersecting vertical plumb element 36 and horizontal sighting element 38 as a further aid to the golfer or other wearer.

Figure 3:
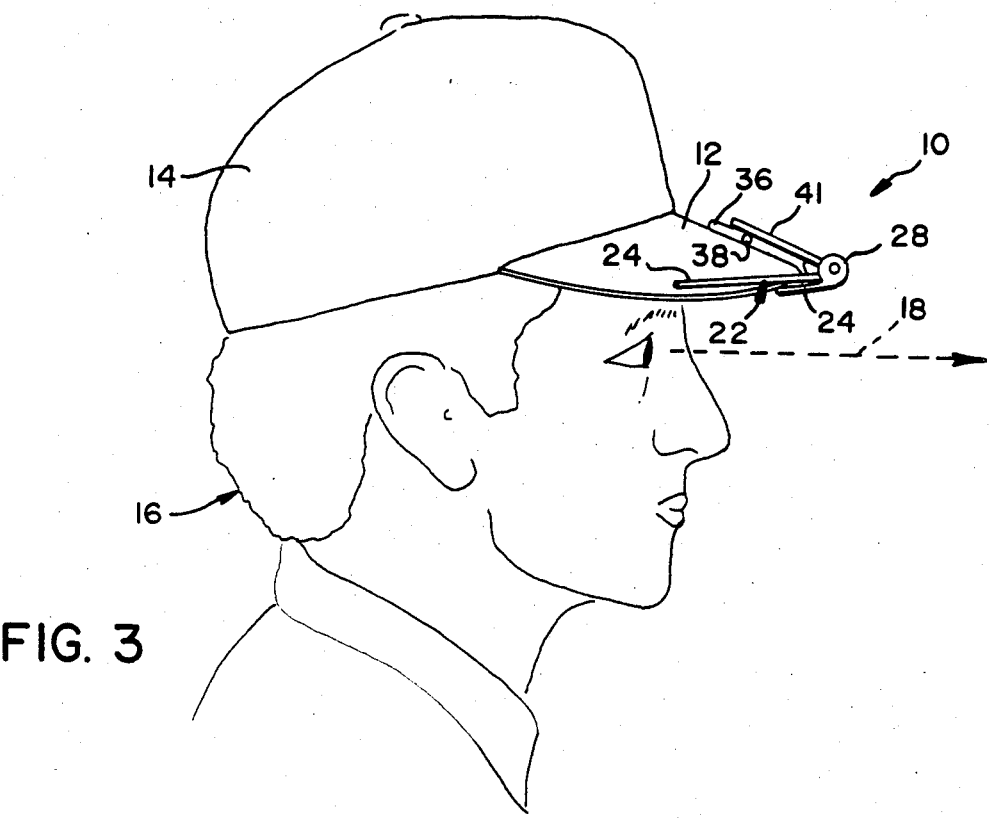
FIG. 3 is a similar view to FIG. 2 but with the device moved into a position where it is out of the wearer's sight line.

The viewing frame 32 is also contemplated as a means for permitting the golfer to rapidly move the vertical plumb element 36 out of his sight line. Referring also to FIG. 3, it may be seen that the lower transverse element 42 intersects the lower end of the vertical plumb element 36. As shown in FIGS. 2 and 4, the vertical plumb element 36 is arranged forwardly of the viewing frame 32. Thus, when the golfer wishes to move the vertical plumb element 36 and the viewing frame 32 out of his sight line 18, it is only necessary for him to rotate the viewing frame 32 in a counter clockwise direction as viewed for example in FIG. 3 in order to position both the viewing frame 32 and vertical plumb element 36 in a position generally indicated at 44 above the bill 12 of the cap. Preferably, one or both of the detents 28 and 30 form yielding stops for tending to maintain the viewing frame 32 either in the position illustrated in FIG. 3 or that illustrated in FIGS. 2 and 4.

Thus, the golfer or other wearer can readily select the time when he wishes to employ the viewing device 10. At such times, it permits him to rapidly assess transverse inclination of terrain. At other times, the device may be moved to the position 44 so that it is out of the wearer's sight line.

Numerous variations and modifications are believed obvious in connection with the present invention and in addition to those described above. Accordingly, the invention is defined only by the following appended claims.

What is claimed is:

1. A viewing device which can be optionally used by a golfer or the like for assessing transverse inclination of terrain, comprising
    base means for attachment to a cap, hat or headpiece worn by the golfer or other wearer,
    a vertical plumb element supported on the base means in front of the wearer for pivotal movement about an axis parallel to the wearer's sight line of the terrain,
    a horizontal sighting element afffixed to the vertical plumb element perpendicular both to the plumb element and its pivotal axis whereby the wearer may view selected terrain relative to the horizontal sighting element and rapidly assess transverse inclination of the terrain,
    hinge means interconnecting the base means and vertical plumb element for permitting selective movement of the vertical plumb element and horizontal sighting element out of the wearer's sight line, and
    retainer means for selectively maintaining the plumb element and sighting element out of the wearer's sight line.

2. The viewing device of claim 1 wherein the retainer means comprises a viewing frame surrounding the intersection of the vertical plumb element and horizontal sighting element to enhance the wearer's use of the viewing device.

3. The viewing device of claim 2 wherein the viewing frame comprises a transverse member intersecting the vertical plumb element below the horizontal sighting element so that the combined vertical plumb element and horizontal sighting element are simultaneously moved out of the wearer's sight line with the viewing frame.

4. The viewing device of claim 2 adapted for mounting on a bill of a cap, the base means being adapted for attachment to the bill of the cap, the vertical plumb element and viewing frame both being hinged to the base means generally parallel with a forward edge of the bill of the cap.

5. The viewing device of claim 3 further comprising detent means formed in the hinge joint between the viewing frame and the base means.

6. The viewing device of claim 5 wherein the detent means comprises stop means for maintaining the viewing frame and accordingly the intersected vertical plumb element and horizontal sighting element in a retracted position on the bill of the cap.

7. The viewing device of claim 6 wherein the detent means comprises additional stop means for maintaining the viewing frame in a selected viewing position with respect to the wearer's sight line.

* * * * *